United States Patent [19]
Gardner et al.

[11] 3,951,192
[45] Apr. 20, 1976

[54] PNEUMATIC TIRE

[75] Inventors: James Dennis Gardner, Akron; James Philip Lawrence, Wadsworth; Stephen Thomas Griebling, Akron, all of Ohio

[73] Assignee: The Firestone Tire & Rubber Company, Akron, Ohio

[22] Filed: Jan. 30, 1975

[21] Appl. No.: 545,263

[52] U.S. Cl............... 152/379 R; 152/353 R; 152/362 CS; 152/330 RF
[51] Int. Cl.² .............. B60C 17/00; B60C 15/06; B60C 13/00
[58] Field of Search............ 152/352, 353, 362 R, 152/362 CS, 379, 330 R, 330 RF

[56] References Cited
UNITED STATES PATENTS

| | | |
|---|---|---|
| 1,337,660 | 4/1920 | Killen ........................ 152/353 R |
| 2,037,640 | 4/1936 | MacMillan ................... 152/362 R |
| 2,874,745 | 2/1959 | Wann ........................... 152/353 R |
| 2,947,342 | 8/1960 | Holloway ..................... 152/362 CS |
| 3,631,913 | 1/1972 | Boileau ........................ 152/362 R |

*Primary Examiner*—Drayton E. Hoffman

[57] ABSTRACT

This disclosure relates to a pneumatic tire construction which has a bead latch located axially outwardly of the rim flange in the lower sidewall area of the tire. This construction provides a safer configuration for the tire when it is run flat or under abnormal conditions. The bead latch prevents the bead from becoming unseated on the rim and moving into the drop center portion of the rim.

5 Claims, 4 Drawing Figures

PNEUMATIC TIRE

BACKGROUND OF THE INVENTION

The ability of a pneumatic tire to run when it is entirely deflated, while always an important factor, has become an increasingly important factor in the design of pneumatic tires. A great deal of emphasis is now being focused upon this characteristic of the tire due to the effort to conserve our scarce raw materials, the effort to eliminate the spare tire in an automobile and the effort to provide a stable, safe tire construction which can withstand the rigors of being run uninflated for at least a certain distance at a certain minimum speed without destroying the remaining useful life of the tire.

The present construction represents an improvement in the design of a pneumatic tire to facilitate its run-flat characteristics. The present construction yields a stable, easily controlled tire when it is run uninflated. This feature adds to the safety of the vehicle operator if it is necessary to run on a deflated tire.

This construction prevents the bead from unseating when the tire is run flat. This construction protects the tire from being damaged during its run-flat operation and helps to preserve the remaining useful life of the tire. If the bead is unseated during the time the tire is being run flat, the bead will drop into the drop center portion of the rim. In this condition, the tire is very unstable and difficult to drive and the tire will be easily damaged by the rim flange cutting into the sidewall.

The prior art has attempted to maintain the bead seated on the tire by other methods; for example, by providing the rim with radially outwardly projections (called safety humps) located axially inwardly of the tire bead so that the tire bead is trapped between these projections and the rim flange. Safety humps, although meeting with some success, have drawbacks which this invention overcomes. When run-flat, the bead is forced upward and away from the rim. The safety humps, to be effective, have to be very high and thus provide difficulty in mounting. Also, the safety humps require another operation in the manufacture of the rim.

Another method is to physically trap the beads between a member which extends axially from the inside of one bead to the inside of the other, bridging the gap between the beads. These members are expensive, complicated and provide difficulty in mounting and dismounting the tire. They have proven to be generally unfit and have had little, if any, commercial application.

Protrusions located in the lower sidewall area of the tire have been proposed which are designed to rest upon the rim flange, but these protrusions have had the drawback that they would not prevent the tire bead from becoming unseated during operation in a run-flat condition. The novel construction of this invention departs from these prior disclosures in the following manner:

1. A substantial portion of the bead latch is located axially outwardly of the rim flange. A part of this portion extends beyond the rim flange both axially outwardly and radially inwardly of the rim flange so that this portion may engulf the rim flange when the tire is run flat.
2. The diameter of the radially inwardly extending portion of the bead latch is less than the outer diameter of the rim flange.
3. A portion of the recessed portion of the bead latch is not in contact with a portion of the rim flange when the tire is in its inflated condition without bearing a load.
4. The rim flange is completely engulfed by the bead latch in the footprint area of the tire when the tire is inflated and under load with part of the bead latch located on the radially inner side of the rim flange.

The novel construction of this invention provides a bead latch which is located in the lower sidewall area of the tire radially outwardly or above the position of the rim flange when the tire is placed on the rim. A substantial portion of the bead latch extends axially outwardly beyond the rim flange for a substantial distance and a portion of this axially outwardly extending part of the bead latch extends radially inwardly of the rim flange. This results in the outer diameter of the rim flange being greater than the diameter of the bead latch.

Due to the compression which the bead has against the rim flange, the novel construction of this invention does not contact the rim flange throughout the entirety of the rim flange, as do the prior art protrusions. This factor results in easily mounting and dismounting of the tire containing the bead latch, a decrease in the abrasive wear which the bead latch would encounter when engaged to the rim flange and in the bead latch being somewhat inoperative during the normal operations of the tire.

It is an object of this invention to provide a tire construction which will prevent the bead from unseating from the rim flange when the tire is run flat thereby preventing the tire bead from dropping into the drop center portion of the rim.

It is another object of this invention to provide a tire construction which will be stable when being operated in a run-flat condition.

It is a further object of this invention to provide a tire which will be capable of being run flat without damaging the remaining useful life of the tire.

other objects will be evident from the detailed description of this construction which follows:

SUMMARY OF THE INVENTION

The novel construction of this invention comprises a bead latch which is located in the lower sidewall area of the tire. The bead latch is located immediately above the rim flange when the tire is mounted. It extends axially outwardly beyond the rim flange and a portion of it which is located axially outwardly of the rim flange extends radially inwardly of the rim flange. The diameter of this radially inwardly extending portion of the bead latch is less than the outer diameter of the rim flange. This configuration forms a recessed portion which receives the rim flange when the tire is mounted on the rim. This construction prevents the bead from becoming unseated when the tire is run flat by engulfing or trapping the rim flange in the recessed portion of the bead latch when the tire is run flat.

The bead latch is designed to engulf the rim flange in the foot print area when the tire is run under normal conditions of load and pressure. It is designed so that it will not contact the entire area of the rim flange in the other areas of the tire's circumference during operation of the tire.

When a tire is run flat, a fulcrum is created at a point on the rim flange. The forces created by the tire sidewall operating on this fulcrum cause the tire bead to lift up and away from the rim flange thereby loosening the tire bead and permitting the bead to be forced down into the drop center portion of the rim. The moment acting upon this tire bead is created by the deflected tire sidewall in its run-flat condition.

The drawings set out these specific forces in more detail. When these forces cause the bead to lift upward and away from the rim, this has a tendency to make safety humps on the rim less effective.

It is a feature of this construction that the recessed portion of the bead latch does not contact the rim flange over a portion of the bead latch when the tire is inflated and under no load. This is due to the molded contour of the tire bead which may be different from that of the rim flange. It is envisioned that the molded shape and resulting clearance may be increased to such an extent that the recessed portion of the bead latch will not contact the rim flange to any significant degree. This would decrease the amount of chafing that would occur in this area of the bead latch and would yield ease in mounting and dismounting the tire.

It is also envisioned that the recessed portion of the bead latch could fit snugly to the rim flange along its horizontal length; however, this construction would be more difficult to mount and dismount and, it is believed, would result in some chafing in the recessed portion of the bead latch.

The bead latch can contain a chafer strip on its perimeter which is designed to resist any chafing or abrading that would occur in that area of the tire. This chafer strip may comprise, for example, a strip of rubber which is designed to resist abrasion and may have embedded in it cords of nylon monofilament or Kevlar. Other chafer type constructions are known in the art and can be substituted without departing from this invention.

The rubber material which comprises the bead latch may be the rubber compound that is used in the sidewall of the tire or an additional strip may be applied of a relatively stiffer rubber compound to provide more strength in the bead latch.

The bead latch may also be stiffened by adding some fabric reinforcing plies in it. These plies may be used in conjunction with the sidewall rubber compound or the relatively stiffer rubber compound as identified above. Both the fabric reinforcement and the rubber compounds referred to are well known to those skilled in the art.

A substantial portion of the latch must extend axially outwardly beyond the rim flange so that the latch is operative in preventing the tire bead from unseating when the tire is run flat. A part of this axially outwardly extending portion of the rim flange must extend to a point radially inwardly of thee rim flange the that the diameter of this part of the bead latch is less than the outer diameter of the rim flange. This construction prohibits the bead from becoming unseated when the tire is run flat.

When the tire is run flat, a fulcrum is created at the point of maximum compression of the bead unto the rim flange. The moment acting upon this fulcrum attempts to move the bead upward and outward from the rim is the sidewall which is being bent as a result of the deflated condition. The compressive forces on the bead have been lost due to the loss of inflation pressure and the adhesive force which still exists in the seated bead is not great enough to resist the moment acting upon the bead so the bead will become dislodged from the rim. After it has been dislodged, due to the rotation of the tire in its run-flat condition, the bead will move down into the drop center of the rim, creating an unstable and unsafe condition in the tire and resulting in the destruction of the tire.

In the novel construction of this invention the presence of the bead latch prevents these forces from tearing loose or moving the bead into the drop center area of the rim. This is accomplished by the rim flange being engulfed or trapped axially inwardly of the portion of the bead latch which extends axially outwardly and radially inwardly of the rim flange. That is, the bead latch is located radially inwardly of the rim flange (it wraps around the rim flange).

This novel construction is particularly effective in radial ply passenger tires and radial ply truck tires. It is useful in bias ply truck tires and has a safety feature in bias ply passenger tires. Bias ply passenger tires are particularly susceptible to the bead becoming unseated when being run flat. The constructtion of this invention will help to keep the bead seated in bias ply passenger tires but not to the degree it does in radial ply tires.

DETAILED DESCRIPTION OF THE INVENTION

Figure 1:
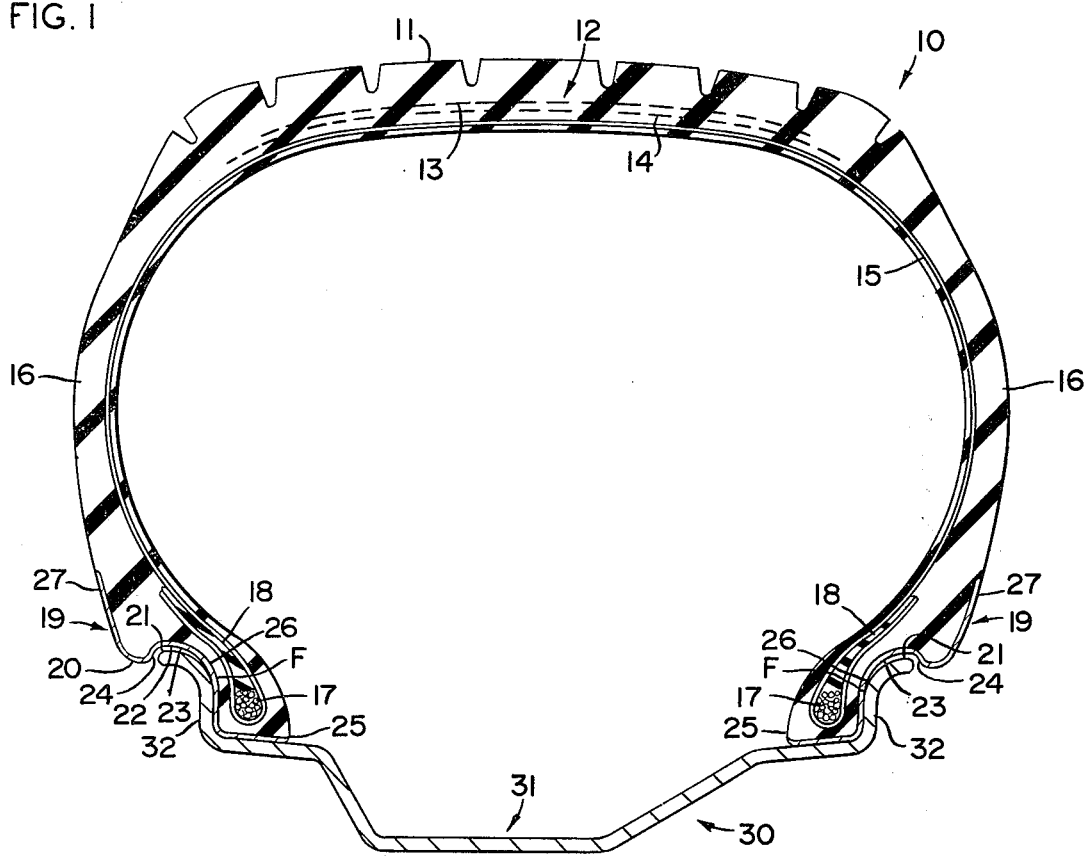
FIG. 1 is a cross-sectional view of a pneumatic tire mounted on a rim embodying the present invention. This tire is shown in the configuration it would have when inflated and not carrying a load.

As shown in FIG. 1, the tire of this invention is depicted generally as 10 with the rim upon which it is mounted being depicted generally as 30. The rim is a standard drop center rim which is utilized in passenger tires having its drop center area shown generally at 31 and its rim flange shown generally at 32.

The tire depicted in FIGS. 1, 2, 3 and 4 is a radial ply passenger tire having a road-engaging tread surface, 11, a stabilizer belt, 12, (comprised of two stabilizer plies, 13 and 14), a body ply, 15, sidewalls, 16, bead rings, 17, and bead fillers, 18, all of known constructions, materials and designs. The bead latch is shown generally at 19.

Figure 2:
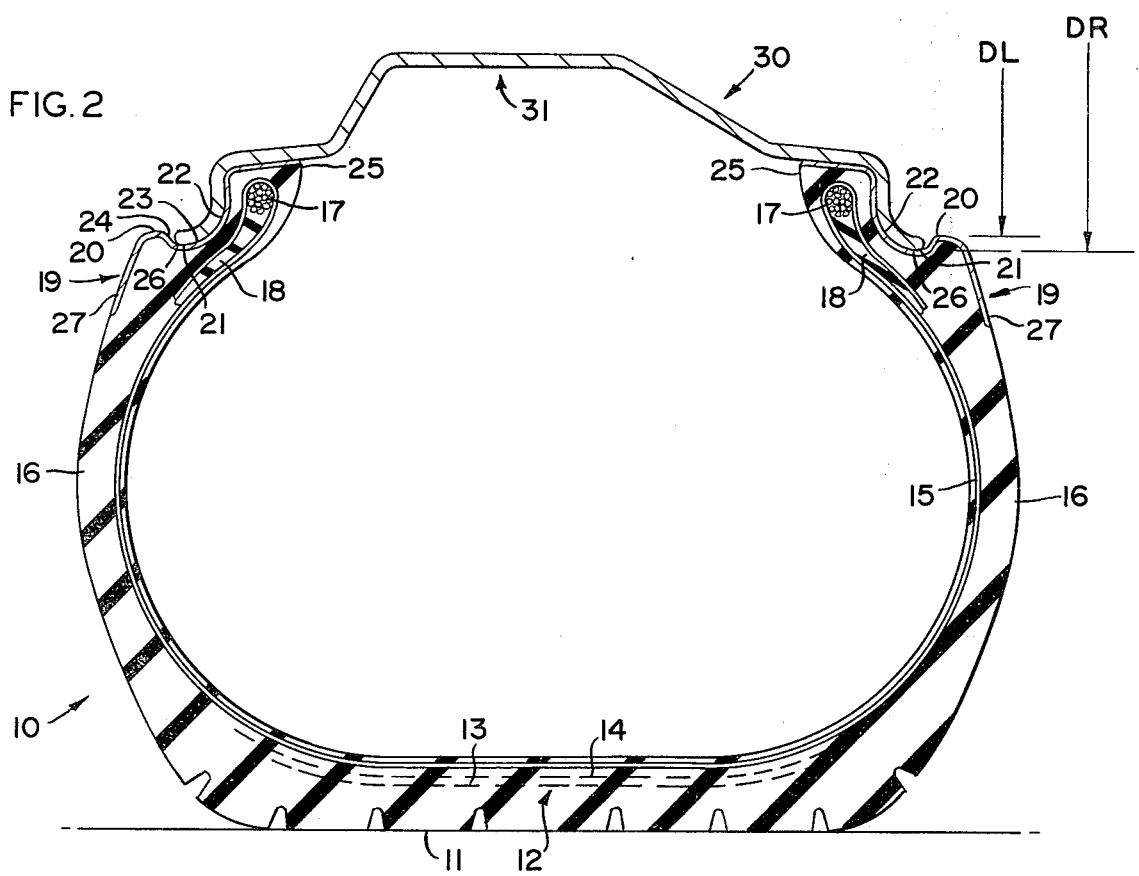
FIG. 2 is a cross-sectional view of the same tire and rim as depicted in FIG. 1 showing the configuration of the tire in its foot print area (road contact area) under normal load and pressure when the latch is positioned to engulf the rim flange.

The bead latch, 19, extends axially outwardly of the rim flange, 32, a substantial distance so that there is a sufficient bulk of the bead latch to engulf and trap the rim flange in the recessed portion, 22, of the bead latch, as shown in FIG. 2. This recessed portion is formed by horizontal wall, 23, and vertical wall, 24. The bead latch also extends axially outwardly and radially inwardly beyond the rim flange so that the diameter of the bead latch measured at 20 (designated as DL which is the line from 20 (the radially innermost point of the bead latch) to the corresponding point on the bead latch 180° away from 20) is less than the outer diameter of the rim flange at 21 (the radially outermost point) on the rim (designated as DR which is the line from 21 to the corresponding point on the rim flange 180 degrees away from 21).

It is preferred that DL be at least equal to or even less than the diameter of the inside of the rim flange (DR minus twice the thickness of the rim flange).

So constructed, the bead latch has a recessed portion, shown generally as 22, having horizontal wall, 23 and vertical wall, 24; which is adopted to receive the rim flange when the tire is mounted and under normal operating conditions. The rim and the rim flange will be in contact with the tire bead from the toe of the bead, 25, to a point on the recessed portion of the bead latch. This point is identified as 26 in FIG. 1. Due to the compression exerted by the tire bead axially outwardly on the rim flange, the rim flange is not in contact with the remaining recessed portion of the bead latch when the tire is inflated and unloaded. This feature facilitates the mounting and dismounting of the tire, placement of the balance weights, and mitigates any abrasion that could occur in the recessed portion of the bead latch and the portion of the bead latch which is located axially outwardly beyond the rim flange. The position of point 26 may be located on another part of the lateral wall, 23, but should not be on vertical wall, 24. Its location depends upon the stiffness and construction of lower sidewall of the tire and the compression of the bead on the rim.

FIG. 1 shows a chafer strip, 27, located from the bead toe, 25, along the entire periphery of the bead latch to a point on the exterior of the lower sidewall a significant radial distance above rim flange. It is necessary for this chafer strip to cover this entire area due to the chafing that will occur in the recessed portion of the bead latch and the portion of the bead latch that is located axially outwardly of the rim flange when the tire is run flat. The chafer may, for example, contain cords of nylon monofilament of Kevlar or have no reinforcement. This figure depicts one with no reinforcement.

FIG. 2 uses the same reference numbers as FIG. 1 and depicts the tire of FIG. 1 in its foot print area (road contact area) when the tire has normal load and pressure conditions acting upon it. This Figure shows that a greater length of the horizontal wall of the recessed portion (point 26 has moved axially outwardly) is in contact with the rim flange under these conditions and that the vertical wall of the recessed portion of the bead latch is not in contact with the rim flange. This configuration shows the latch in position to engulf the rim flange. It is understood that the greater the tire deflection, the greater is the engulfing position of the latch.

Figure 3:
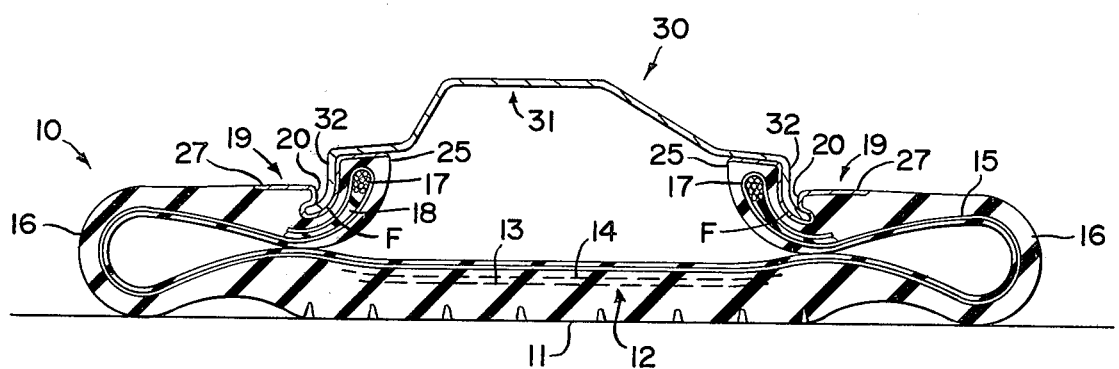
FIG. 3 is a cross-sectional view of the same tire and rim as depicted in FIG. 1 wherein the tire is deflated and under load, its run-flat condition with the latch in operative position completely engulfing the rim flange.

The same reference numbers are used to identify the tire in FIG. 3. FIG. 3 depicts the tire when it is deflated and bearing a load, its run-flat condition. As can be seen from FIG. 3, the bead latch 19 has completely engulfed the rim flange, 32, so that, if the bead becomes unseated, it will not be free to move down into the drop center area of the rim. In this engulfing position, the vertical wall has rotated to be positioned on the radially inner side of the rim flange (a rotation of about 90°). A portion of the bead latch is now located radially inwardly of the rim flange which results in the trapping of the rim flange and the securing of the bead to the rim.

But for this bead latch, the bead would become unseated due to the forces that are applied to the bead which tend to lift the bead away from the rim and rim flange. These forces are pivoted about a fulcrum, Point F, on the rim flange. As can be seen from FIG. 3, the lower sidewall area of the tire supplies the moment to the fulcrum point, F, which tries to force the tire bead, 17, away from the tire rim. It can be envisioned that this force would succeed and that the tire bead would break loose and slide down into the drop center area of the rim, 31, but for the presence of the bead latch.

Figure 4:
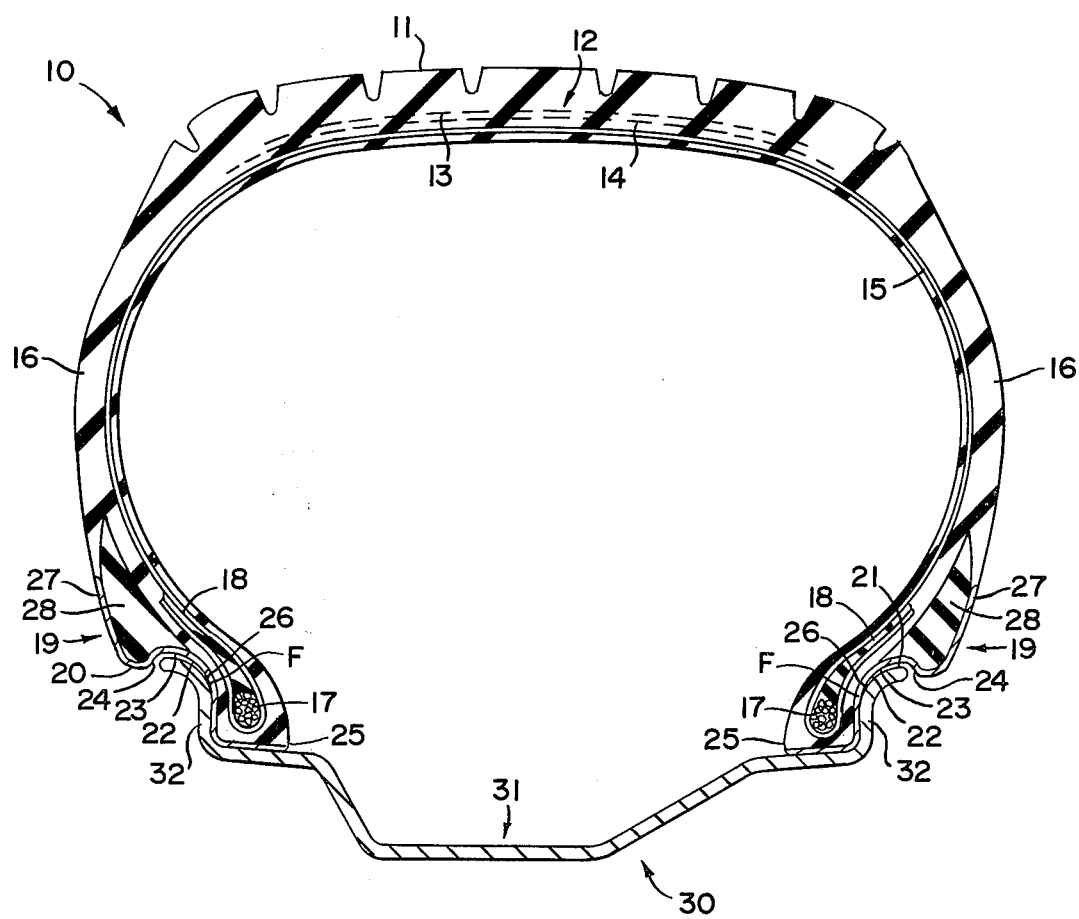
FIG. 4 is a cross-sectional view of another embodiment of this invention.

In FIG. 4 the bead latch is shown containing a strip, 28, of relatively hard, high modulus rubber compound. This rubber compound replaces the sidewall compound which is shown in FIGS. 1, 2 and 3. It stiffens the bead latch so that it will more effectively engulf the rim flange when the tire is run flat. It is understood that this bead latch may also contain some fabric reinforcement to provide further stiffening in this area.

The Applicants have utilized the novel construction of this invention in a HR70-15 size tire. The tire was mounted on a standard rim identified by the industry as a 6×15 JK rim. The diameter of the rim flange was 16.380 inches. The diameter of the bead latch of the construction of this invention when mounted on the rim and inflated was 15.988 inches. The section height of the tire was 6.65 inches and the section width was 9.40 inches, both measured under inflated and unloaded conditions on a 6.5 inch rim. The bead latch extended axially beyond the rim flange a distance of 0.5 inches including a gap of 0.1 inches between the rim flange vertical wall of the recess. As the differences in diameters indicate, the bead latch extended radially below the rim flange a distance of 0.2 inches.

This novel construction is particularly suited to radial ply passenger tires. The radial ply tire has better run-flat capabilities than a bias type tire in that the sidewalls in the radial tire are flexible and may bend more radially to get out of the way when the tire is run flat.

We claim:

1. In combination, a pneumatic tire and a rim wherein said tire is designed to be mounted on said rim, said tire having a bead latch located in the lower sidewall area of each of its sidewalls, said rim having a drop center portion and two flange portions designed to receive the beads of said tire, said bead latch having a portion which extends axially outwardly and radially inwardly of said rim flange when said tire is mounted on said rim, said bead latch comprising a recessed portion adapted to fit said rim flange having a horizontal wall and a vertical wall, said rim flange contacting said horizontal wall along the entire outer periphery of said rim flange and not contacting said vertical wall when said tire is subjected to normal inflation pressure and load, said rim flange partially contacting said horizontal wall along said rim flange's outer periphery and not contacting said vertical wall when said tire is subjected to normal inflation pressure and not under load, said combination having the diameter of said bead latch less than the outer diameter of said rim flange so that said bead latch engulfs said rim flange when the tire is run uninflated and under load thereby preventing the tire bead from becoming unseated during said run-flat operation.

2. The combination of claim 1 wherein a substantial portion of said bead latch which engulfs the rim flange contains the rubber compound which is used for the sidewall of said tire.

3. The combination of claim 1 wherein a substantial portion of said bead latch which engulfs the rim flange contains a hard, high modulus rubber compound.

4. The combination of claim 1 wherein said bead latch has a chafer strip which is resistant to the abrasion caused by the rim when the tire is running under normal conditions or running flat, said chafer strip located on and covering the entire periphery of said bead latch from a point substantially radially above said rim flange to a point in contact with said rim flange.

5. The combination of claim 1 wherein said bead latch contains reinforcing cord material.

* * * * *

UNITED STATES PATENT OFFICE
CERTIFICATE OF CORRECTION

Patent No. 3,951,192  Dated April 20, 1976

Inventor(s) James Dennis Gardner, James Philip Lawrence & Stephen Thomas Griebling It is certified that error appears in the above-identified patent and that said Letters Patent are hereby corrected as shown below:

Column 3, line 55 - "thee rim" should read --the rim--;

Column 3, line 55 - "flange the" should read --flange so--;

Column 5, line 30 - "of kevlar" should read - or kevlar--;

Column 6, line 25 - "0.2 inches" should read --.2 inches--.

Signed and Sealed this

Tenth Day of August 1976

[SEAL]

Attest:

RUTH C. MASON
*Attesting Officer*

C. MARSHALL DANN
*Commissioner of Patents and Trademarks*